United States Patent
Nakamura

(10) Patent No.: US 12,504,471 B2
(45) Date of Patent: Dec. 23, 2025

(54) SEMICONDUCTOR DEVICE AND METHOD OF SCAN TEST FOR THEREOF

(71) Applicant: RENESAS ELECTRONICS CORPORATION, Tokyo (JP)

(72) Inventor: Kazushi Nakamura, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 182 days.

(21) Appl. No.: 18/470,911

(22) Filed: Sep. 20, 2023

(65) Prior Publication Data

US 2024/0142519 A1 May 2, 2024

(30) Foreign Application Priority Data

Oct. 27, 2022 (JP) ................................. 2022-172190

(51) Int. Cl.
*G01R 31/26* (2020.01)
*G01R 31/317* (2006.01)

(52) U.S. Cl.
CPC .............................. *G01R 31/31727* (2013.01)

(58) Field of Classification Search
CPC ...... G01R 31/31727; G01R 31/318552; G01R 31/318575
See application file for complete search history.

(56) References Cited

U.S. PATENT DOCUMENTS

| | | | | |
|---|---|---|---|---|
| 8,055,964 B2* | 11/2011 | Tokunaga | ...... | G01R 31/318552 714/730 |
| 8,055,965 B2* | 11/2011 | Kaneko | ...... | G06F 1/32 714/731 |
| 8,812,921 B2* | 8/2014 | Tekumalla | ...... | G01R 31/318594 714/726 |
| 2012/0249204 A1* | 10/2012 | Nishioka | ...... | G01R 31/318594 327/202 |
| 2023/0315141 A1* | 10/2023 | Jain | ...... | G06F 1/06 327/291 |

FOREIGN PATENT DOCUMENTS

JP 2012-185127 A 9/2012

* cited by examiner

*Primary Examiner* — Thang X Le
(74) *Attorney, Agent, or Firm* — Rimon P.C.

(57) ABSTRACT

In scan testing of semiconductor devices, instantaneous power consumption in both shift and capture modes is efficiently reduced. The scan chain is provided with circuit blocks 1 to 4. Each of the temporary storage flip-flops F1 to F3 is connected between one of the two circuit blocks. Clock generating circuit 10 outputs a clock signal CLK used for the scan test. The clock gating cells GC1 to GC4 takes the clock signal CLK and provides the clock signals CLK1 to CLK4 to circuit blocks 1 to 4 and the clock signals CLK1 to CLK3 to the temporary storage flip-flops F1 to F3. The control circuit 20 controls the clock gating cells GC1 to GC4 so as to operate the circuit blocks 1 to 4 at differing timings from the input-side one by one and simultaneously operate each circuit block and a temporary storage flip-flop connected to the output of each circuit block.

7 Claims, 15 Drawing Sheets

FIG. 9

| SHIFT CONFIG. | SHIFT CONFIG. 1 | SHIFT CONFIG. 2 | SHIFT CONFIG. 3 | SHIFT CONFIG. 4 |
|---|---|---|---|---|
| CONFIG. NO. | 0 | 1 | 2 | 3 |
| SC1 | 0 | 0 | 0 | 1 |
| SC2 | 0 | 1 | 1 | 1 |
| SC3 | 0 | 0 | 1 | 1 |
| CIRCUIT GROUP NO. | 1 | 2 | 3 | 4 |
| SHIFT TIME | S ←――――――――――――――→ L | | | |
| POWER CONSUMPTION | H ←――――――――――――――→ L | | | |

| CAPTURE CONFIG. | CAPTURE CONFIG. 1 | CAPTURE CONFIG. 2 | CAPTURE CONFIG. 3 | CAPTURE CONFIG. 4 |
|---|---|---|---|---|
| CONFIG. NO. | 0 | 1 | 2 | 3 |
| CIRCUIT GROUP NO. | 1 | 2 | 3 | 4 |
| SHIFT TIME | S ←――――――――――――――→ L | | | |
| POWER CONSUMPTION | H ←――――――――――――――→ L | | | |

FIG. 13

| SHIFT CONFIG. | SCON1 | SCON2-1 | SCON2-2 | SCON2-3 | SCON3-1 | SCON3-2 | SCON3-3 | SCON4 |
|---|---|---|---|---|---|---|---|---|
| CONFIG. NO. [1:0] | 2'b00 | 2'b01 | 2'b01 | 2'b01 | 2'b10 | 2'b10 | 2'b10 | 2'b11 |
| CONFIG. NO. [3:2] | 2'b00 | 2'b00 | 2'b00 | 2'b00 | 2'b00 | 2'b00 | 2'b00 | 2'b00 |
| CONFIG. NO. [5:4] | 2'b00 | 2'b01 | 2'b01 | 2'b01 | 2'b01 | 2'b01 | 2'b01 | 2'b01 |
| CONFIG. NO. [7:6] | 2'b00 | 2'b01 | 2'b01 | 2'b01 | 2'b10 | 2'b10 | 2'b10 | 2'b10 |
| CONFIG. NO. [9:8] | 2'b00 | 2'b01 | 2'b01 | 2'b01 | 2'b10 | 2'b10 | 2'b10 | 2'b11 |
| CONFIG. NO. [10] | 1'b0 | 1'b1 | 1'b1 | 1'b1 | 1'b1 | 1'b1 | 1'b1 | 1'b1 |
| CONFIG. NO. [11] | 1'b0 | 1'b1 | 1'b0 | 1'b0 | 1'b1 | 1'b0 | 1'b0 | 1'b1 |
| CONFIG. NO. [12] | 1'b0 | 1'b0 | 1'b0 | 1'b1 | 1'b1 | 1'b1 | 1'b0 | 1'b1 |
| CIRCUIT GROUP NO. | 1 | 2 | 2 | 2 | 3 | 3 | 3 | 4 |
| SHIFT TIME | S ↓ | | | | | | | ↑ L |
| PEAK POWER COMSUMPTION | H ↓ | | | | | | | ↑ L |

FIG. 14

| CAPTURE CONFIG. | CCON1 | CCON2-1 | CCON2-2 | CCON2-3 | CCON3-1 | CCON3-2 | CCON3-3 | CCON4 |
|---|---|---|---|---|---|---|---|---|
| CONFIG. NO. [1:0] | 2'b00 | 2'b01 | 2'b01 | 2'b01 | 2'b10 | 2'b10 | 2'b10 | 2'b11 |
| CONFIG. NO. [3:2] | 2'b00 | 2'b00 | 2'b00 | 2'b00 | 2'b00 | 2'b00 | 2'b00 | 2'b00 |
| CONFIG. NO. [5:4] | 2'b00 | 2'b01 | 2'b01 | 2'b00 | 2'b01 | 2'b01 | 2'b01 | 2'b01 |
| CONFIG. NO. [7:6] | 2'b00 | 2'b01 | 2'b01 | 2'b01 | 2'b10 | 2'b10 | 2'b10 | 2'b10 |
| CONFIG. NO. [9:8] | 2'b00 | 2'b01 | 2'b01 | 2'b01 | 2'b10 | 2'b10 | 2'b10 | 2'b11 |
| CIRCUIT GROUP NO. | 1 | 2 | 2 | 2 | 3 | 3 | 3 | 4 |
| CAPTURE TIME | S | ← | | | | | | → L |
| PEAK POWER COMSUMPTION | H | ← | | | | | | → L |

SEMICONDUCTOR DEVICE AND METHOD OF SCAN TEST FOR THEREOF

CROSS-REFERENCE TO RELATED APPLICATIONS

The disclosure of Japanese Patent Application No. 2022-172190 filed on Oct. 27, 2022, including the specification, drawings and abstract is incorporated herein by reference in its entirety.

BACKGROUND

The present disclosure relates to a semiconductor device and a scan test method of the semiconductor device.

A scan test is known as a method of testing semiconductor devices. Generally, when performing a scan test, the scan flip-flop connected to the same scan chain inside the semiconductor device operates using the same scan clock in the capture mode/shift mode.

However, with the recent increase in the scale of semiconductor devices, the number of flip-flops to be scanned also becomes enormous. Therefore, if many flip-flops are operated with a single scan clock, the instantaneous power consumption during scan testing increases. To reduce instantaneous power consumption, semiconductor equipment suppliers spend a lot of time in the design phase in power analysis. Further, due to the increase in instantaneous power consumption, it is impossible to satisfy the power specifications of the semiconductor device, there is a problem that cannot be tested. Furthermore, the user of the semiconductor device also has to spend much time optimizing the design of its own product and analyzing the power because of the increase of the instantaneous power consumption. Therefore, there is a growing need for a scan test method that can suppress instantaneous power consumption.

To satisfy such needs, a method of reducing the instantaneous power consumption in the scan test has been proposed (Patent Document 1). In this method, a plurality of circuit blocks having a scan flip-flop and a combination circuit forming a scan chain during a scan test are configured in a semiconductor device. A plurality of selection circuits, based on the control signal, the clock signal supplied to each of the circuit block, an internal clock signal used in actual operation, and a scan clock signal used during the scan test, between. The control circuit generates a scan clock that includes a shift clock of the same timing in each of the circuit blocks during a shift mode that inputs and outputs data to the scan chain. In addition, during the capture mode in which the logic operation of the combinational circuit is tested, a capture clock is generated which includes pulses of different timings at each of the circuit blocks.

According to this technique, the clock supplied to each of the circuit blocks can be supplied at different timings during a scan test, especially when a capture operation is performed, so that the instantaneous power consumption can be reduced to perform the test.

There are disclosed techniques listed below.
[Patent Document 1] Japanese Unexamined Patent Application Publication 2012-185127

SUMMARY

The technique according to Patent Document 1, although the instantaneous power consumption in the capture mode can be reduced, since the clock is supplied to each circuit block at the same time during the shift mode, it is impossible to reduce the number of scan flip-flops to be activated. Therefore, it is not possible in principle to reduce the instantaneous power consumption in shift mode. Though the technique to reduce the instantaneous power consumption of the shift mode by dividing the scan chain and dividing the shift operation for each chain is generally known, the instantaneous power consumption in the capture mode cannot be reduced even in this case.

Therefore, there are limitations in reducing the time required for power analysis and design optimization through shift and capture modes. In the design of the semiconductor device, there are cases where the power specification in the shift mode is severe or the power specification in the capture mode is severe depending on the layout, and this becomes a factor which devotes a lot of time for the power analysis and the optimization of the design.

Therefore, it is necessary to establish a method that can efficiently reduce the instantaneous power consumption in both shift mode and capture mode.

Other objects and novel features will become apparent from the description of this specification and the accompanying drawings.

A semiconductor device according to an embodiment comprises: a scan chain divided into a plurality of circuit blocks; a plurality of temporary storage flip-flops connected between an output of one of two adjacent circuit blocks and an input of the other; a clock signal generator for outputting a clock signal to be used for a scan test; a plurality of clock gating cells for outputting the clock signal to the plurality of circuit blocks and the plurality of temporary storage flip-flops; and a control circuit for operating the circuit blocks at different timings one by one on the input side and simultaneously operating the temporary storage flip-flop and the one circuit block connected to the output of the one circuit block.

A scan test method for a semiconductor device according to an embodiment includes receiving a clock signal used for a scan test, and outputting the clock signal to a plurality of temporary storage flip-flops connected between an output of one of the plurality of circuit blocks and two adjacent circuit blocks of a scan chain divided into a plurality of circuit blocks and an input of the other, thereby operating the circuit block at different timings one by one from the input side, and simultaneously operating the temporary storage flip-flop connected to the output of one circuit block and the one circuit block.

According to one embodiment, instantaneous power consumption in both shift and capture modes can be efficiently reduced in scan testing of semiconductor devices.

BRIEF DESCRIPTION OF THE DRAWINGS

FIG. 9 is a diagram showing shift configuration and capture configuration according to the third embodiment.

FIG. 13 is a diagram showing shift configuration according to the fourth embodiment.

FIG. 14 is a diagram showing capture configuration according to the fourth embodiment.

DETAILED DESCRIPTION

Figure 1:
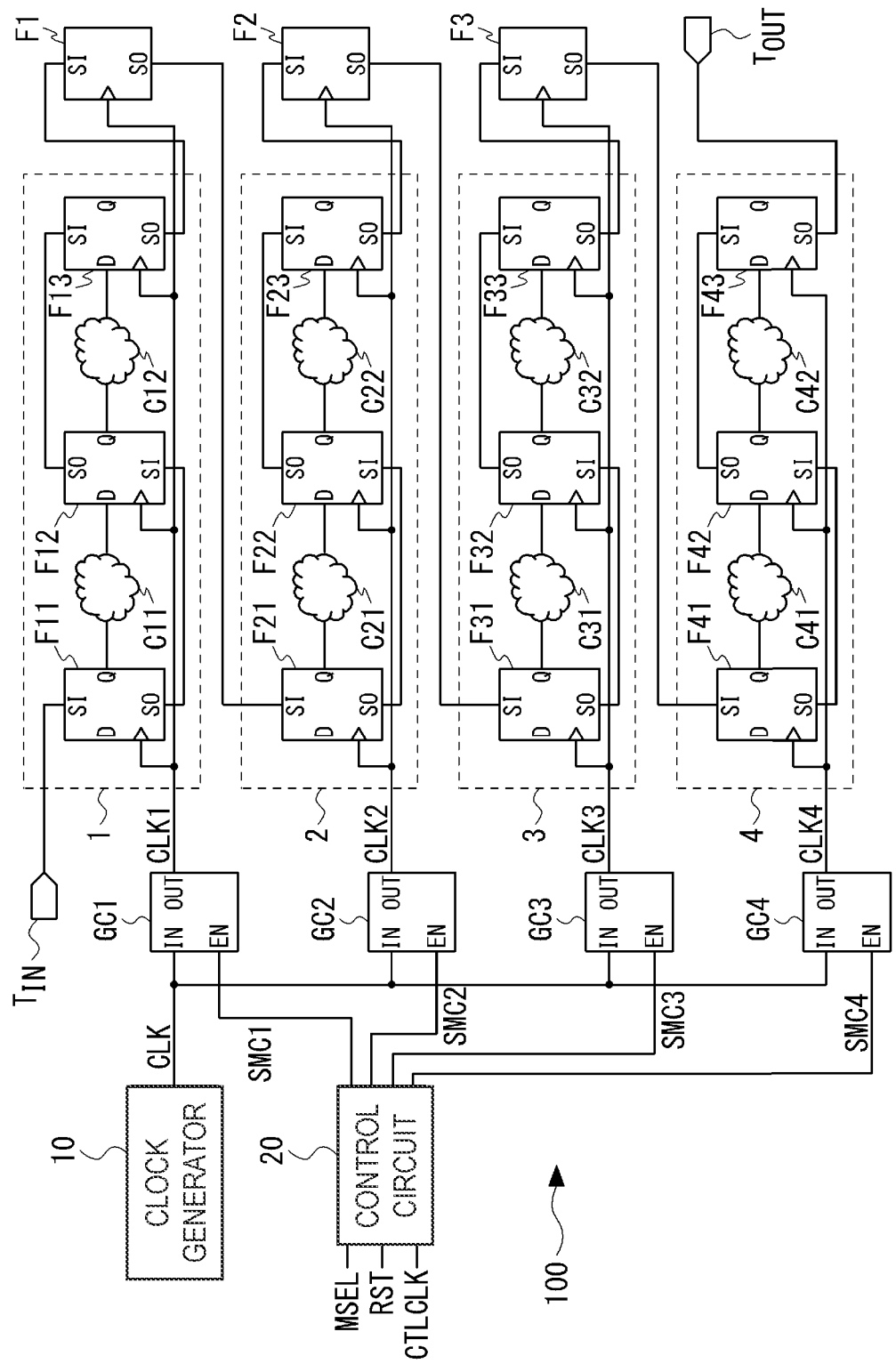
FIG. 1 is a diagram schematically showing configuration of a semiconductor device according to a first embodiment.

Hereinafter, an embodiment of the present invention will be described with reference to the drawings. In the drawings, the same elements are denoted by the same reference numerals, and redundant description is omitted if necessary.

First Embodiment

A semiconductor device according to a first embodiment will be described. A semiconductor device 100 according to the first embodiment is configured to perform a scan test by dividing a scan chain into a plurality of circuit blocks. Corresponding to dividing the scan chain into a plurality of circuit blocks, the semiconductor device 100, a clock gating cell for supplying a clock signal to each circuit block is provided. Between the two adjacent circuit blocks, a temporary storage flip-flop for passing the data of the previous circuit block to the subsequent circuit block is provided.

FIG. 1 shows a configuration of the semiconductor device 100 according to the first embodiment schematically. In FIG. 1, as an example, four circuit blocks 1 to 4 are provided in the semiconductor device 100. Correspondingly, the semiconductor device 100 is provided with four clock gating cells GC1 to GC4 and three flip-flops F1 to F3.

A clock generating circuit 10 is connected to the clock gating cells GC1 to GC4 of the input terminal IN, and supplies a clock signal CLK to the clock gating cells GC1 to GC4.

A control circuit 20 is configured to control the operation of the semiconductor device 100 in response to a mode select signal MSEL, a reset signal RST, and a control clock CTLCLK. The control circuit 20 is connected to the enable signal terminal EN of the clock gating cells GC1 to GC4 and supplies clock control signals SMC1 to SMC4 to each of the clock gating cells GC1 to GC4.

The output terminal OUT of the clock gating cells GC1 to GC4 are connected to the circuit blocks 1 to 4, respectively. The clock gating cells GC1 to GC4 supplies clock signals CLK1 to CLK4 to the circuit blocks 1 to 4 in response to the clock control signals SMC1 to SMC4.

The circuit block 1 has flip-flops F11 to F13 constituting the scan chain and combinatorial circuits C11 and C12. A clock input terminal of the flip-flops F11 to F13 is connected to the output terminal OUT of the clock gating cell GC1, the clock signal CLK1 is supplied.

The scan input terminal SI of the flip-flop F11 is connected to the scan input terminal TIN of the semiconductor device 100. Between the output terminal Q of the flip-flop F11 and the data terminal D of the flip-flop F12, the combinational circuit C11 is connected. The scan output terminal SO of the flip-flop F11 is connected to the scan input terminal SI of the flip-flop F12. Between the output terminal Q of the flip-flop F12 and the data terminal D of the flip-flop F13, the combinational circuit C12 is connected. The scan output terminal SO of the flip-flop F12 is connected to the scan input terminal SI of the flip-flop F13.

The scan output terminal SO of the flip-flop F13 is connected to the scan input terminal SI of the temporary storage flip-flop F1.

The circuit blocks 2 to 4 have the same configuration as the circuit block 1. That is, the flip-flops F21 to F23 of the circuit block 2 correspond to the flip-flops F11 to F13 of the circuit block 1, respectively, and the combinational circuits C21 and C22 correspond to the combinatorial circuits C11 and C12, respectively. The flip-flops F31 to F33 of the circuit block 3 correspond to the flip-flops F11 to F13 of the circuit block 1, respectively, and the combinational circuits C31 and C32 correspond to the combinatorial circuits C11 and C12, respectively. The flip-flops F41 to F43 of the circuit block 4 correspond to the flip-flops F11 to F13 of the circuit block 1, respectively, and the combinational circuits C41 and C42 correspond to the combinatorial circuits C11 and C12, respectively.

The clock input terminal of the flip-flops F21 to F23 of the circuit block 2, the clock signal CLK2 is input from the clock gating cell GC2. The clock input terminal of the flip-flops F31 to F33 of the circuit block 3, the clock signal CLK3 is input from the clock gating cell GC3. The clock input terminal of the flip-flops F41 to F43 of the circuit block 4, the clock signal CLK4 is input from the clock gating cell GC4.

The scan output terminal SO of the flip-flops F23 and F33 are connected to the scan input terminal SI of the temporary storage flip-flops F2 and F3, respectively. The scan output terminal SO of the flip-flop F43 is connected to the scan output terminal TOUT of the semiconductor device 100.

The scan output terminal SO of the temporary storage flip-flop F1 is connected to the scan input terminal SI of the flip-flop F21 of the circuit block 2. The scan output terminal SO of the temporary storage flip-flop F2 is connected to the scan input terminal SI of the flip-flop F31 of the circuit block 3. The scan output terminal SO of the temporary storage flip-flop F3 is connected to the scan input terminal SI of the flip-flop F41 of the circuit block 4.

The clock signals CLK1 to CLK3 are supplied to the clock input terminals of the temporary storage flip-flops F1 to F3 from the clock gating cells GC1 to GC3.

Figure 2:
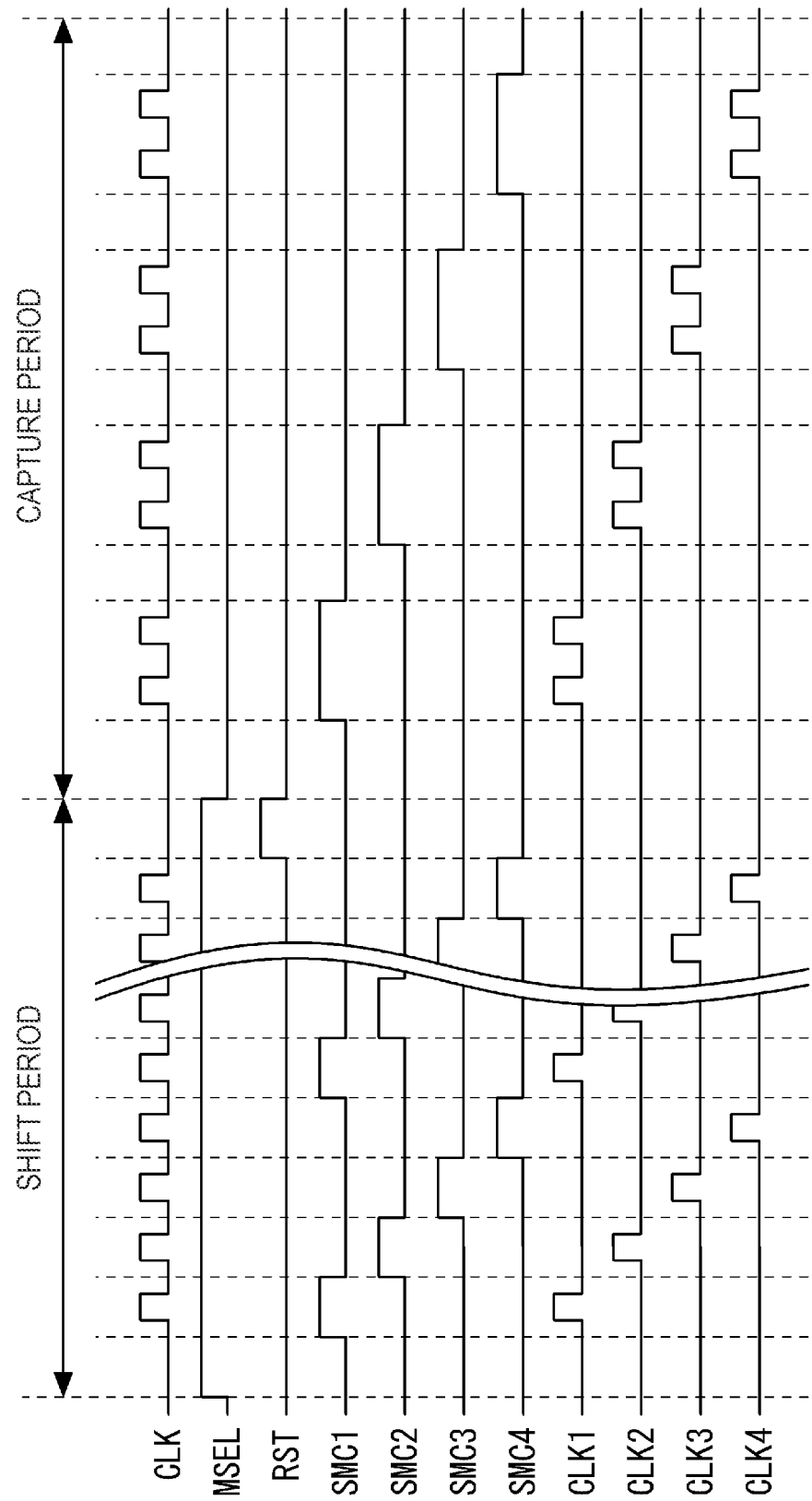
FIG. 2 is a timing chart for performing a scan test in the semiconductor device according to the first embodiment.

Subsequently, the scan test operation of the semiconductor device 100 is explained. In this embodiment, the circuit blocks 1 to 4 constituting one scan chain, one by one, performs a shift operation and a capture operation. FIG. 2 shows a timing chart in the case where a scan test is performed in the semiconductor device 100 according to the first embodiment.

When the mode select signal MSEL is valid, for example, during a period in which the value is "1'b1", a shift mode is set. When the mode select signaling MSEL is disabled, for example, during a duration in which it is "1'b0", the capture mode is enabled. When switching the operation mode, enable the reset signal RST immediately after the shifting operation of all the circuit blocks is completed, for example, the value and "1'b1", disable the reset signal RST immediately before entering the capture operation, for example, the value "1'b0". Thus, while switching from shift mode to capture mode, it is possible to reset the control circuit 20.

The clock gating cells GC1 to GC4 supplies the clock signal CLK to each of the circuit blocks 1 to 4 as the clock signals CLK1 to CLK4 only while the clock control signals SMC1 to SMC4 are valid. This allows the clock signals CLK1 to CLK4 to be provided in sequence and exclusively to each of the circuit blocks 1 to 4 in both shift and capture modes.

Subsequently, the shift operation in the scan test in the semiconductor device 100.

First, in the shift mode in which the mode select signal MSEL is valid, the data is shifted to the circuit block 1 and the temporary storage flip-flop F1. The control circuit 20 enables the clock control signal SMC1, for example, its value and "1'b1", disables the clock control signals SMC2 to SMC4, for example, the value and "1'b0". Thus, only the circuit block 1 performs an operation, the circuit blocks 2 to 4 are in a state of not operating.

While the clock control signal SMC1 is valid, the clock gating period GC1 generates a clock signal CLK1 by one cycle, and the scan test data input from the scan input terminal TIN is shifted to the flip-flop F11 in the circuit block 1 in synchronization with the clock signal CLK1. The flip-flop F12 stores data held by the previous flip-flop F11, and the flip-flop F13 stores data held by the previous flip-flop F12. The data retained by the flip-flop F13 is shifted to the temporary storage flip-flop F1.

The data is then shifted to the circuit block 2 and to the temporary storage flip-flop F2. The control circuit 20 enables the clock control signal SMC2 and disables the clock control signals SMC1, SMC3 and SMC4. Thus, only the circuit block 2 performs an operation, the circuit blocks 1, 3 and 4 are in a state of not operating.

While the clock control signal SMC2 is valid, the clock gating cell GC2 generates a clock signal CLK2 for one cycle, and data input from the scan output terminal SO of the temporary storage flip-flop F1 is shifted to the flip-flop F21 in synchronization with the clock signal CLK2. The flip-flop F22 stores data held by the previous flip-flop F21, and the flip-flop F23 stores data held by the previous flip-flop F22. The data retained by the flip-flop F23 is shifted to the temporary storage flip-flop F2.

The data is then shifted to the circuit block 3 and to the temporary storage flip-flop F3. Configuration and operation of the circuit block 3 is the same as the circuit block 2. As a result, the scan test data input from the scan output terminal SO of the temporary storage flip-flop F2 is shifted to the flip-flop F31, and the data held by the flip-flop F33 is shifted to the temporary storage flip-flop F3. Other overlapping descriptions are omitted.

The data is then shifted to circuit block 4. Configuration and operation of the circuit block 4 is the same as the circuit blocks 2 and 3. Thus, the scan test data input from the scan output terminal SO of the temporary storage flip-flop F3 is shifted to the flip-flop F41. Data held by the flip-flop F43 is output to the scanning output terminal TOUT of the semiconductor device 100.

In the shift mode, the test data input from the scan input terminal TIN is shifted to all of the flip-flops constituting the circuit blocks 1 to 4, so that the above-described shift operation of the circuit blocks 1 to 4 is repeated.

In the capture mode in which the mode select signal MSEL is disabled, the capture operation is performed one by one in the circuit blocks 1 to 4 in the same manner as in the shift mode.

As described above, according to the present configuration, in one scan chain, the group composed of one circuit block, so that the N provided. Then, by performing the data shift by changing the circuit block (i.e., the group) in order one cycle, while limiting the number of nodes to be activated at the same time to one circuit block (i.e., one group) can be realized shift operation and capture operation without losing data. Therefore, the instantaneous power consumption can be effectively reduced in both the shift mode and the capture mode, although the test execution time is longer than when performing a general scan test without grouping the scan chain into multiple groups.

Further, according to the present configuration, only by changing the circuit configuration of the semiconductor device, without physically separating the scan chain, only the control of the clock signal supplied to each circuit block, it is possible to efficiently reduce the instantaneous power consumption.

Second Embodiment

In the first embodiment, a configuration has been described in which a single scan chain is divided into a plurality of circuit blocks and a scan test is performed to reduce instantaneous power consumption. However, in some situations, it is also envisioned that a general scan test is required without dividing one scan chain into multiple circuit blocks. Therefore, in the present embodiment, even when one scan chain is divided into a plurality of circuit blocks, a semiconductor device capable of scanning test even if not divided will be described.

Figure 3:
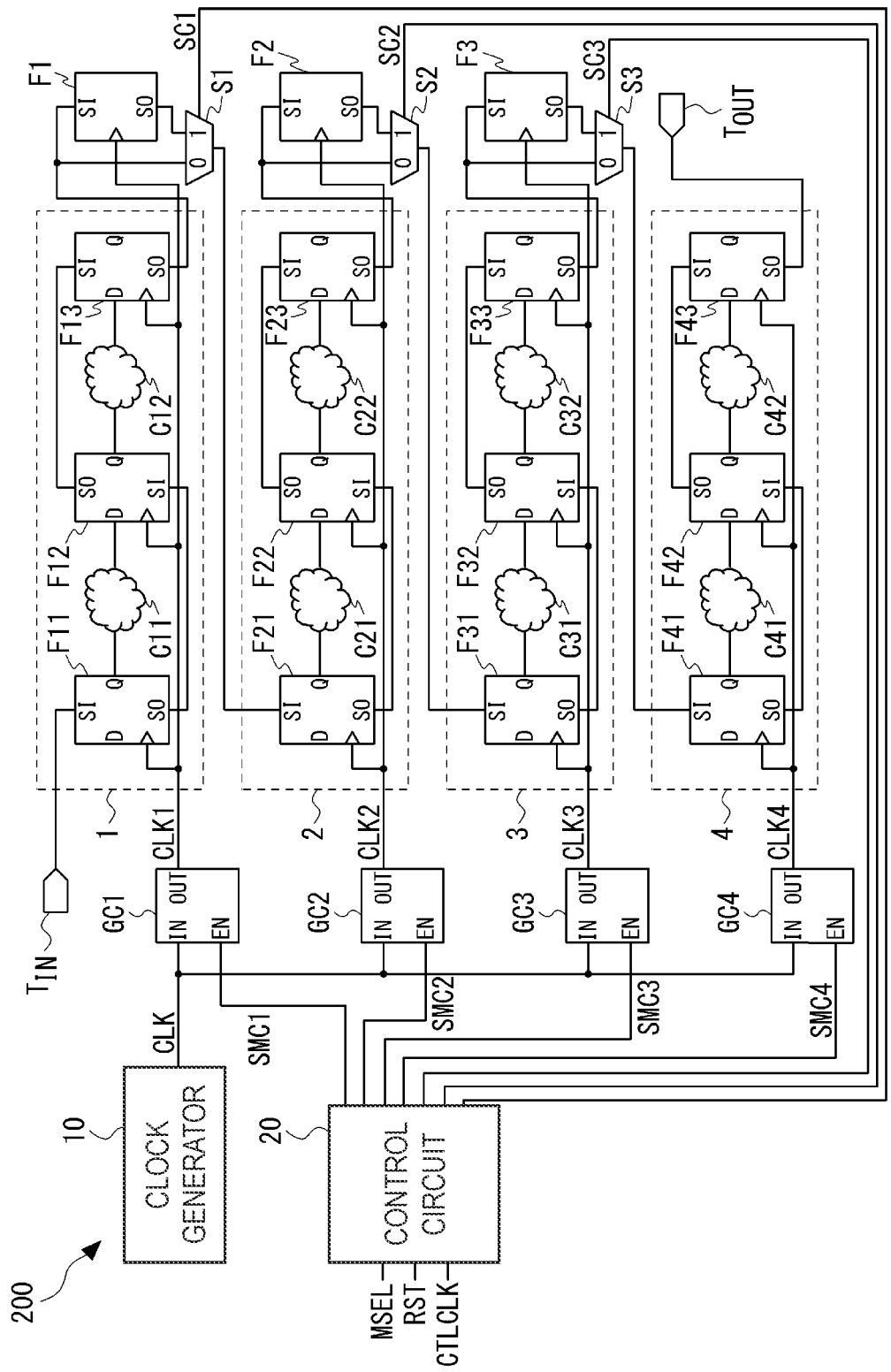
FIG. 3 is a diagram schematically showing configuration of a semiconductor device according to a second embodiment.

FIG. 3 shows a configuration of a semiconductor device 200 according to a second embodiment schematically. The semiconductor device 200, the semiconductor device 100 according to the first embodiment, selection circuits S1 to S3 for switching the execution and non-execution of the scan chain grouping is added. Other configurations of the semiconductor device 200 are roughly same as that of the semiconductor device 100, therefore only different points will be described below.

The selection circuits S1 to S3 are provided after the circuit blocks 1 to 3, respectively. One input terminal of the selection circuits S1 to S3 (in FIG. 3, the input terminal "0") is connected to the flip-flops F13, F23 of the circuit blocks 1 to 3 and the scan output terminal SO of F33, respectively. The other input terminal of the selection circuits S1 to S3 (input terminal "1" in FIG. 3) is connected to the scan output terminal SO of the temporary storage flip-flops F1 to F3, respectively.

The control circuit 20, the selection circuits S1 to S3, and outputs a switching control signals SC1 to SC3, respectively. In the present configuration, when the switching control signal SC1 is disabled, for example, "0", the selection circuit S1 connects the input terminal "0" and the output terminal. And when the switching control signal SC1 is enabled, for example, "1", the selection circuit S1 connects the input terminal "1" and the output terminal. For the selection circuits S2 and S3, similarly to the selection circuit S1, respectively according to the switching control signals SC2 and SC3, performs switching of the signal path.

Figure 4:
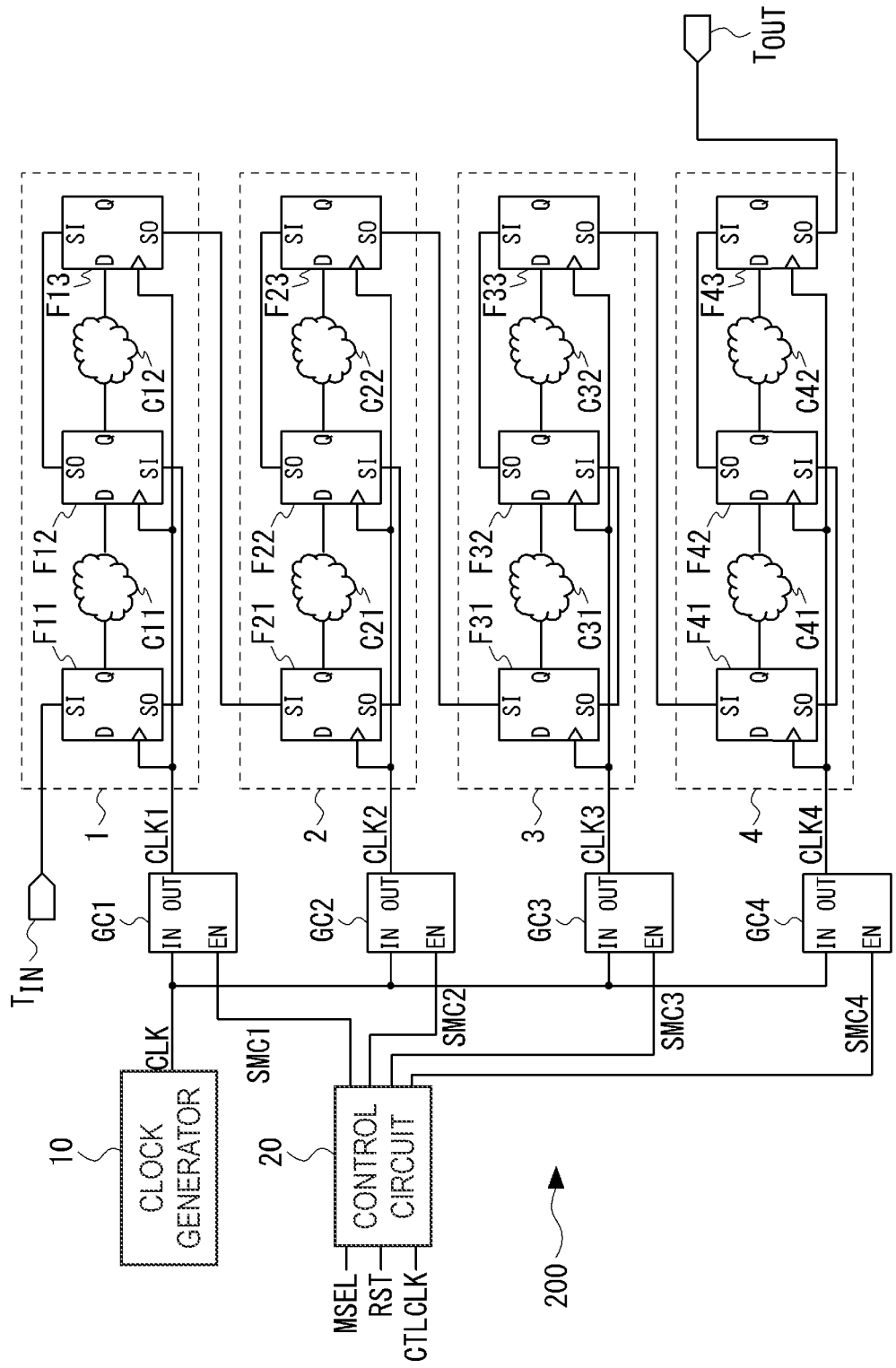
FIG. 4 is a diagram showing a circuit configuration in the case of performing a general scan test without grouping in the semiconductor device according to the second embodiment.
Figure 5:
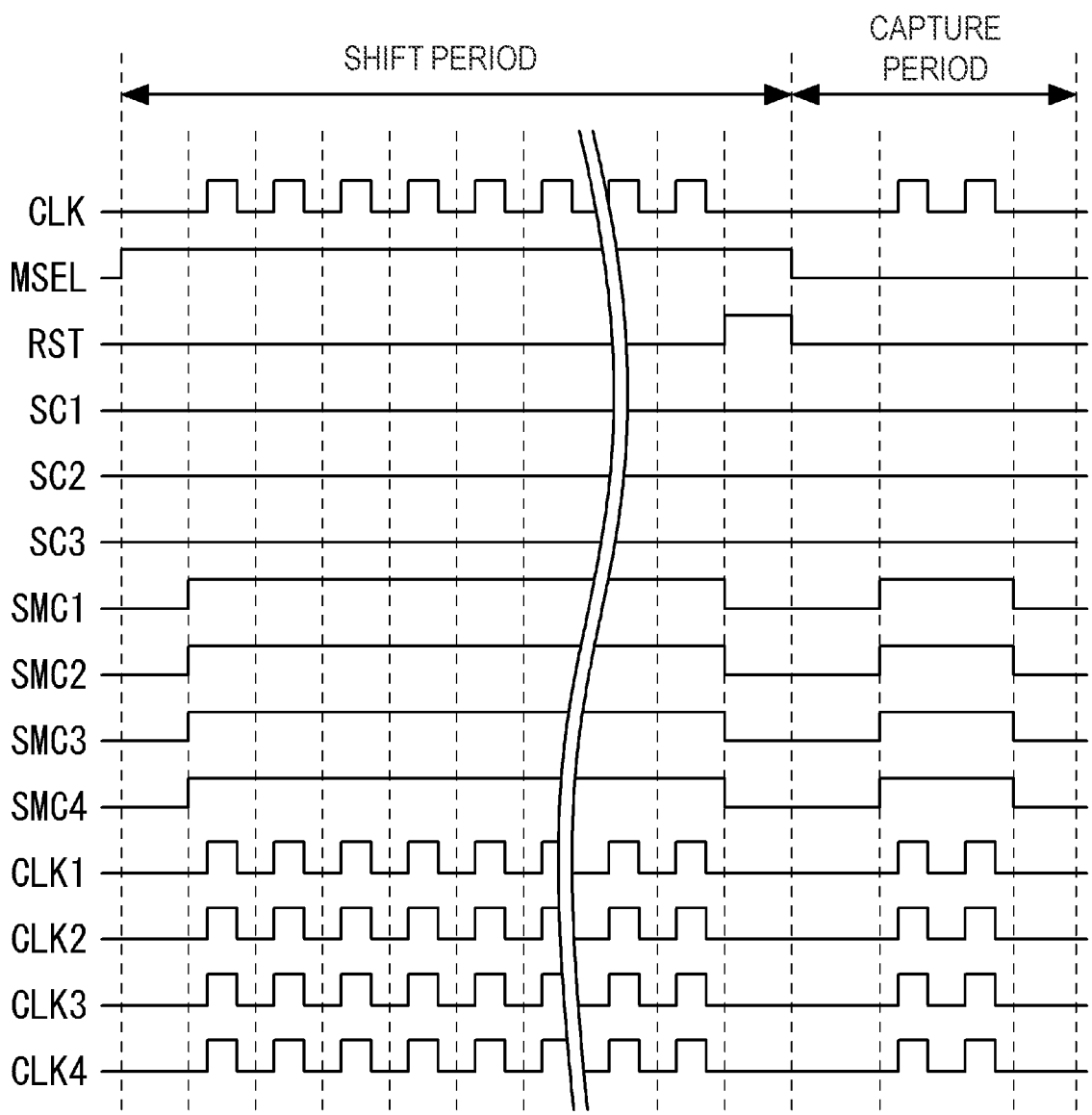
FIG. 5 is a timing chart of the case of performing a general scan test in the semiconductor device according to the second embodiment.

The operation of the semiconductor device 200 will be described first when a general scan test is performed without performing grouping of scan chains. FIG. 4 shows a circuit configuration in the case of performing a general scan test without grouping in the semiconductor device 200 according to the second embodiment. Further, FIG. 5 shows a timing chart in the case of performing a general scan test in the semiconductor device 200 according to the second embodiment.

In this case, the control circuit 20 disables the switching control signals SC1 to SC3 for supplying to the selection circuits S1 to S3, for example, "0". Thus, the input terminal "0" and the output terminal is connected in the selection circuits S1 to S3, the circuit configuration shown in FIG. 4 is realized.

Therefore, as shown in FIG. 4, the flip-flops included in the circuit blocks 1 to 4 constitute a single scan chain without the temporary storage flip-flops F1 to F3 being interposed. In this condition, a common scan test can be performed by supplying clock signals CLK1 to CLK4 to each of the circuit blocks 1 to 4 at the same time.

Figure 6:
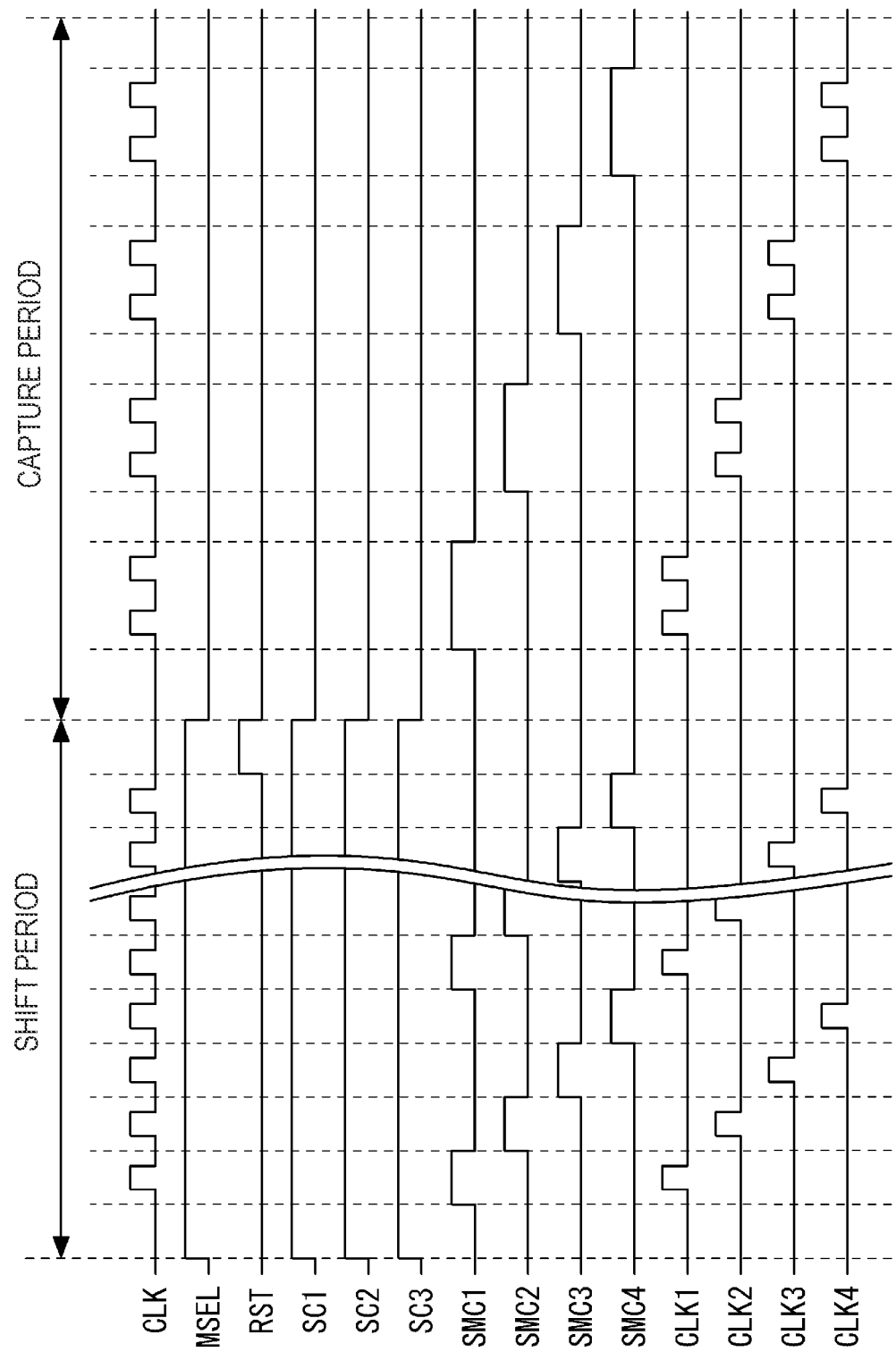
FIG. 6 is a timing chart when performing a scan test by grouping in the semiconductor device according to the second embodiment.

Next, similar to the first embodiment, the case where the scan test is performed by grouping the scan chains will be described. FIG. 6 shows a timing chart of the case of performing a scan test by grouping in the semiconductor device 200 according to the second embodiment.

In this case, the control circuit 20 enables the switching control signals SC1 to SC3 for supplying to the selection circuits S1 to S3, for example, "1". Thus, in the selection circuits S1 to S3, the input terminal "1" and the output terminal are connected, the same circuit configuration as shown in FIG. 1 is realized, it is possible to perform the same scan test as described in the first embodiment.

As described above, according to the present configuration, in the same semiconductor device, even when one scan chain is divided into a plurality of circuit blocks, it is possible to perform a scan test even when not divided.

This makes it possible to flexibly select a scan test method depending on whether instantaneous power consumption is prioritized by dividing the scan chain or the test execution time is prioritized without dividing the scan chain according to needs.

Third Embodiment

In first embodiment and second embodiment, an example of performing a scan test by dividing the scan chain into four circuit blocks has been described. However, depending on the user performing the scan test, it is assumed that the user wants to flexibly adjust the grouping of scan chains. Therefore, in this embodiment, a semiconductor device capable of changing the grouping of scan chains will be described.

Figure 7:
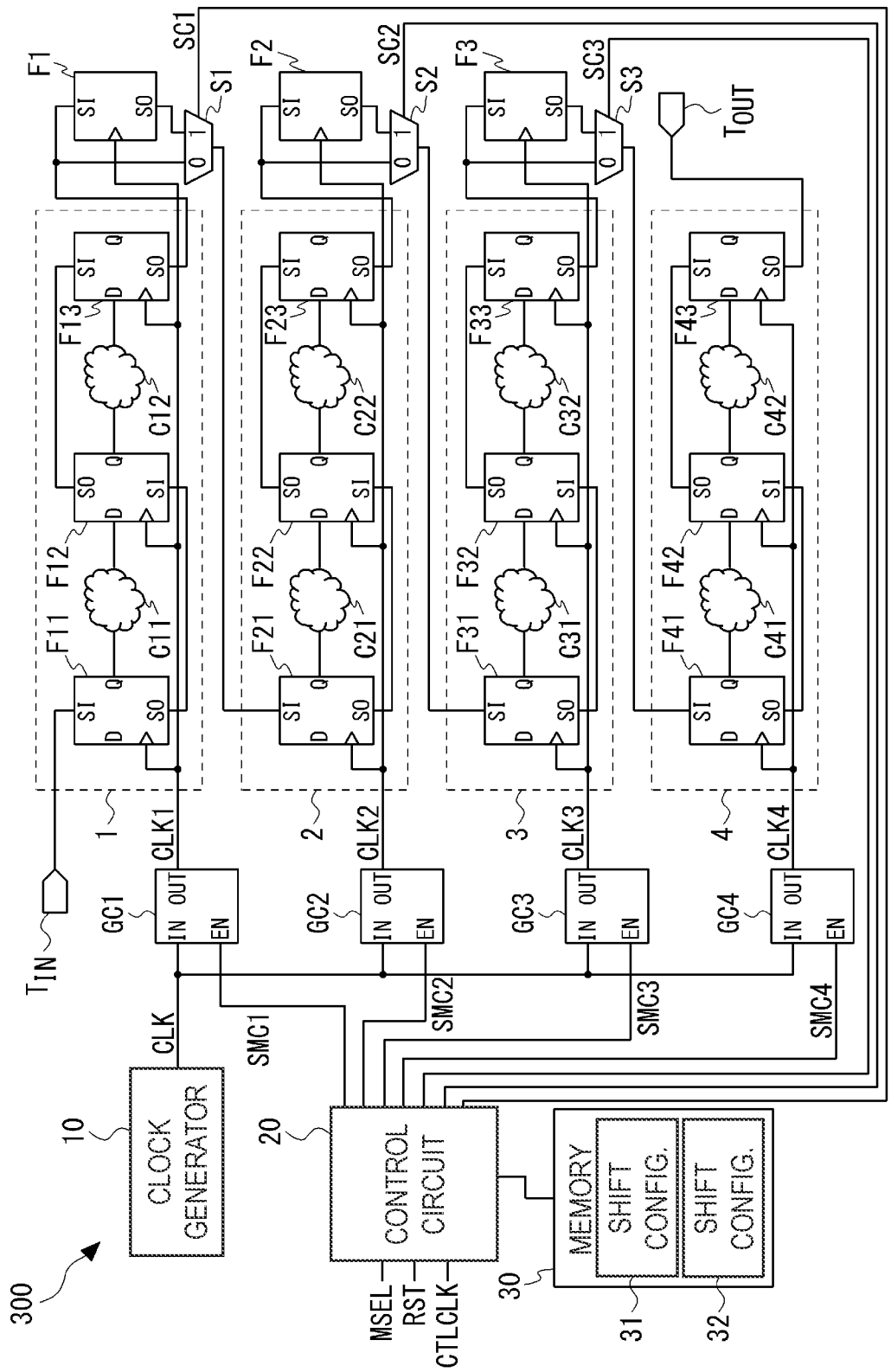
FIG. 7 is a diagram schematically showing configuration of a semiconductor device according to a third embodiment.

FIG. 7 shows a configuration of a semiconductor device 300 according to the third embodiment schematically. The semiconductor device 300 has a configuration in which a memory 30 is added to the semiconductor device 200 according to the second embodiment.

Figure 8:
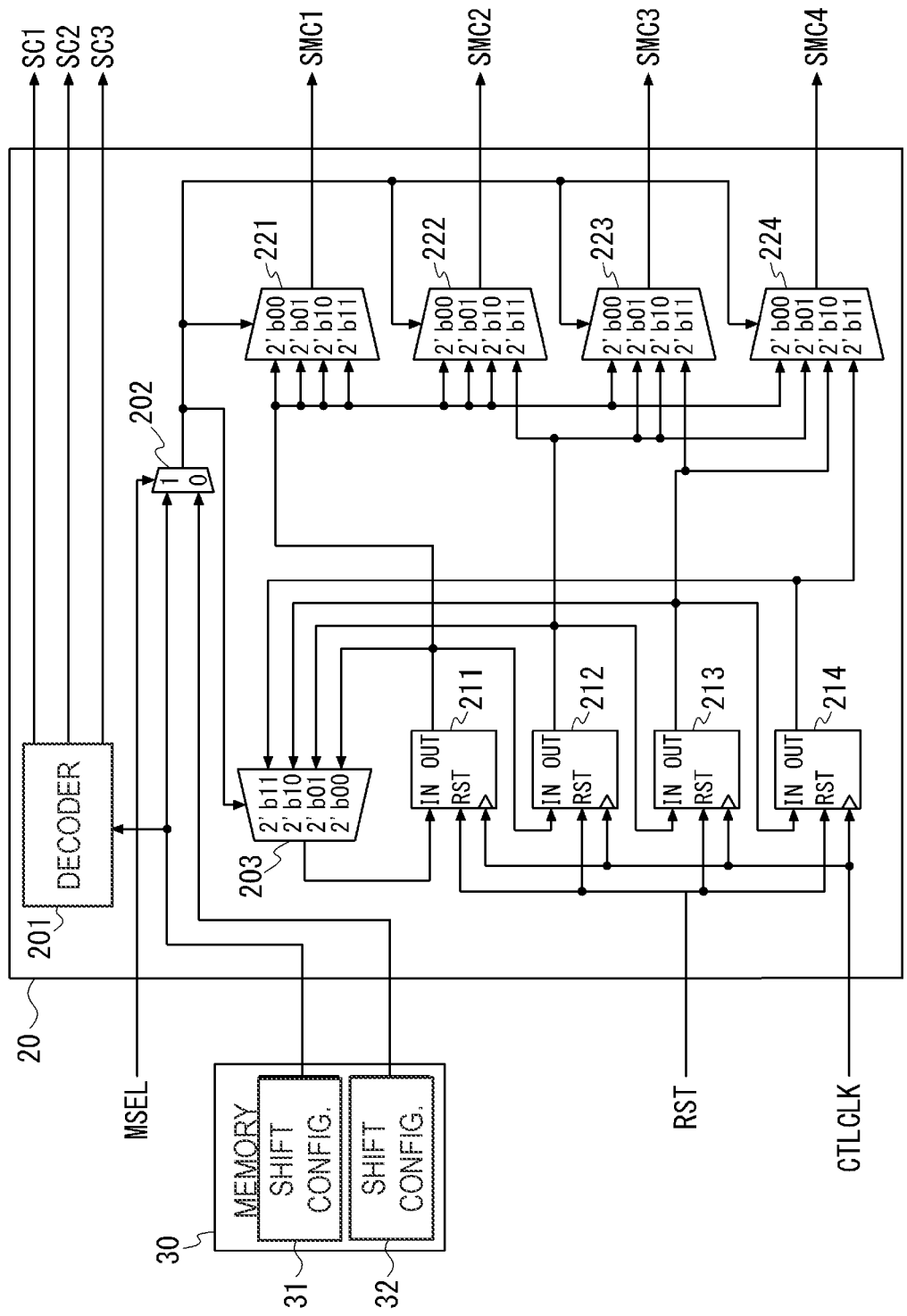
FIG. 8 is a diagram schematically showing configuration of the control circuit according to the third embodiment.

The control circuit 20 is configured to read the shift configuration 31 and the capture configuration 32, which are stored in the memory 30 and are used for controlling the semiconductor device 300, so that the grouping of the scan chains can be made adjustable. FIG. 8 shows a configuration of a control circuit 20 according to the third embodiment schematically. The control circuit 20 includes a decoder 201, a select circuits 202 and 203, flip-flops 211 to 214, and select circuits 221 to 224. The control circuit 20 reads out the parameters of the shift configuration 31 and the capture configuration 32 held by the memory 30 and inputs the parameters as a configuration number to the decoder 201 and the selection circuit 202.

The decoder 201 decodes the configuration number of the shift configuration 31, and outputs a switching control signals SC1 to SC3.

The selection circuit 202, in response to the mode select signal MSEL, the configuration number of the shift configuration 31 in the shift mode, the configuration number of the capture configuration 32 in the capture mode, and outputting to the selection circuit 203, 221 to 224.

The selection circuit 203 selects one of the output signals from the flip-flops 211 to 214 based on the output signal of the selection circuit 202 and outputs it to the input terminal IN of the flip-flop 211.

The flip-flops 211-214 operate on the control clock CTLCLK and are initialized by enabling the reset signal RST. The flip-flop 211 sets "1'b1" as the initial value, and flip-flops 212 to 214 set "1'b0" as the initial value.

The flip-flop 211 receives outputs from the select circuit 203 and outputs data to select circuits 203, 221-224 and flip-flop 212. The flip-flop 212 receives outputs from flip-flop 211 and outputs data to select circuits 203, 222-224 and flip-flop 213. The flip-flop 213 receives outputs from the flip-flop 212 and outputs data to the select circuits 203, 223, 224 and the flip-flop 214. The flip-flop 214 receives outputs from the flip-flop 213 and outputs data to select circuits 203, 224.

The selection circuit 221, based on the output of the selection circuit 202, and outputs the output signal of the flip-flop 211 as a clock control signal SMC1. The selection circuit 222 selects one of the output signals of the flip-flops 211 and 212 based on the output of the selection circuit 202 and outputs it as a clock-controlled signal SMC2. The selection circuit 223 selects one of the output signals of the flip-flops 211-213 based on the output of the selection circuit 202 and outputs it as a clock-controlled signal SMC3. The selection circuit 224 selects one of the output signals of the flip-flops 211-214 based on the output of the selection circuit 202 and outputs it as a clock-controlled signal SMC4.

Next, the operation of the scan test of the semiconductor device 300. In shift mode, in response to the mode select signal MSEL signal, the selection circuit 202 selects "1". Thus, the selection circuit 202, the shift configuration 31 stored in the memory 30 can be reflected in the control performed by the control circuit 20.

FIG. 9 shows the shift configuration and capture configuration according to the third embodiment. For example, when selecting the shift configuration 4, as shown in FIG. 9, the decoder 201, the value of the switching control signals SC1 to SC3 is 1. Thus, the selection of the selection circuits S1 to S3 is to select "1", i.e. to select the entry "1". In this case, since the same circuit configuration as in FIG. 1 is realized, it is possible to perform a scan test by dividing the scan chain into four circuit blocks 1 to 4.

In addition, in the shift configuration 1, the circuit blocks 1 to 4 constitute a single scan chain without being divided. In shift configuration 2, one group in circuit blocks 1 and 2, two groups of one group in circuit blocks 3 and 4 are configured. In shift configuration 3, one group in the circuit block 1 and 2, one group in the circuit block 3, three groups of one group in the circuit block 4 is constituted.

In the following, a group composed of two or more circuit blocks is referred to as a first group, a group composed of only one circuit block is also referred to as a second group.

The following describes the case of selecting the shift configuration 4. The configuration number is "3" when shift configuration 4 is selected. Thus, all of the selection circuits 203, 221 to 224 select "2'b11".

The initial value "1'b1" held by the flip-flop 211 is outputted in synchronization with the control clock CTLCLK, and is then stored in the flip-flop 212. The flip-flop 211 also receives the "1'b0" held by the flip-flop 214 through select circuit 203. The flip-flop 212 outputs a "1'b1" to the flip-flop 213 and receives a "1'b0" from the flip-flop 211 in the following one-cycle of the control clock CTLCLK. By repeating this series of operations, the flip-flops 211 to 214 output "1'b1" in sequence and exclusively.

Since the selections of the selection circuits 221 to 224 are all "2'b11", the signals output by the flip-flops 211 to 214 are output as clock-control signals SMC1 to SMC4, respectively.

Until all the shift operation is completed, by repeating this series of operations, the clock control signals SMC1 to SMC4 performs the same operation as the timing chart in the shift mode shown in FIG. 2.

Thus, by setting the shift configuration 31, it is possible to control the switching control signals SC1 to SC3 and the clock control signals SMC1 to SMC4. As a result, the number of groupings in the scan chain can be changed and appropriate clock signals can be supplied to each group.

When switching from shift mode to capture mode, the reset signal RST is enabled immediately after the shift operation of all the circuit blocks is completed, and then the reset signal RST is disabled immediately before starting the capture operation. This allows the flip-flops 211 to 214 to be initialized.

In capture mode, the selection circuit 202 selects "0" in response to the mode select signal MSEL. Thus, the capture configuration 32 held by the memory 30 can be reflected in the control of the control circuit 20.

Even in the capture mode, the capture configuration 32 is used, by controlling the control circuit 20, it is possible to change the number of groups only by the clock control signals SMC1 to SMC4. In addition, the relationship between the time taken for the capture operation and the instantaneous power consumption is the same as in the shift mode.

As described above, according to the present configuration, the number of groups when the scan chains are grouped can be flexibly changed according to the request. This allows for flexible changes in scan test time and instantaneous power consumption as needed.

The configuration number to be applied, the shift mode and the capture mode, it is also possible to set a different value. For example, the shift configuration 2 in the shift mode, i.e. select the configuration number "1", the shift configuration 3 in the capture mode, i.e. select the configuration number "2".

Figure 10:
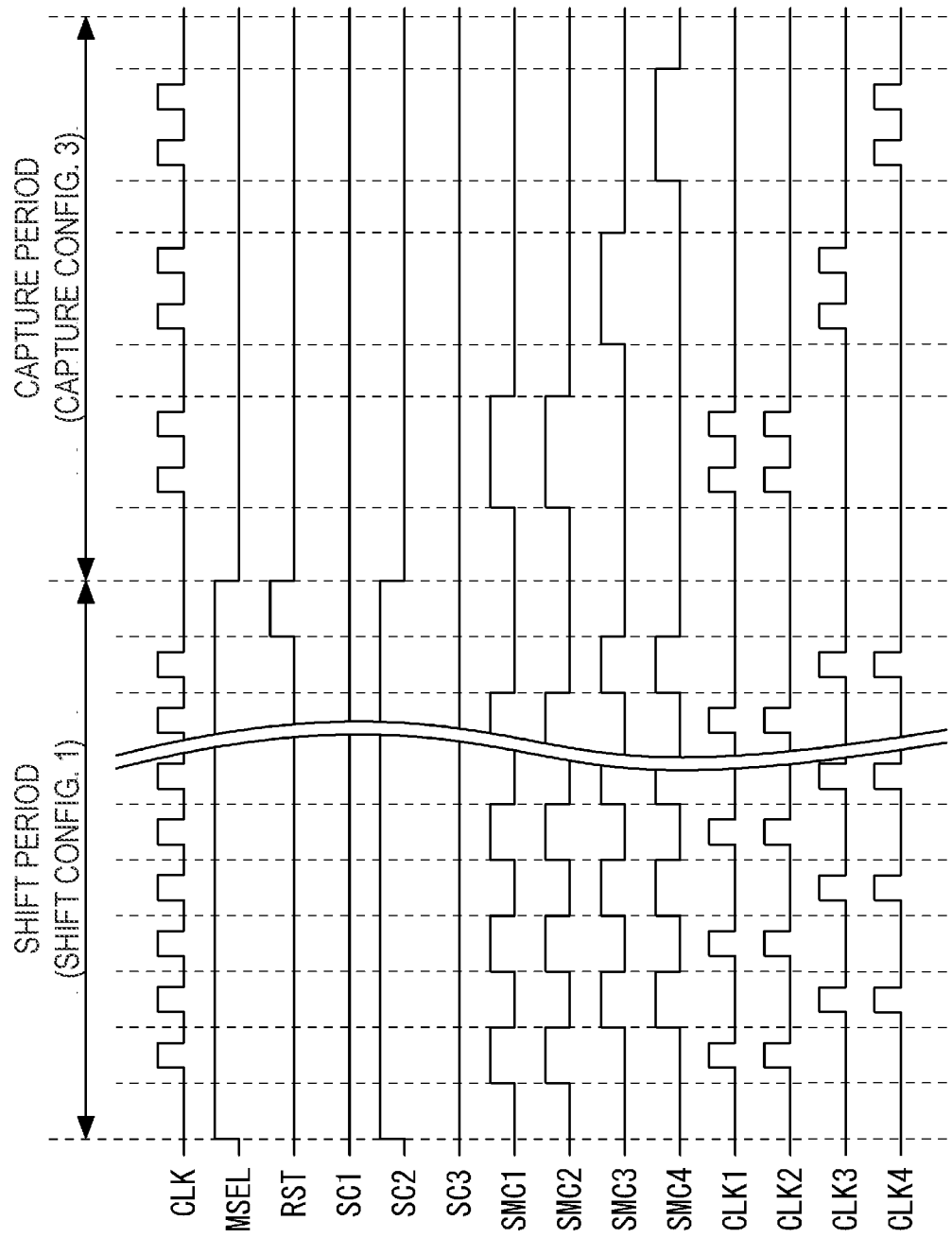
FIG. 10 is a timing chart of each signal when selecting the shift configuration 2 in the shift mode and the shift configuration 3 in the capture mode in the third embodiment.

FIG. 10 shows the timing chart of each signal when shift configuration 2 is selected in shift mode and capture configuration 3 is selected in capture mode. When the shift configuration 2 is selected in the shift mode, the circuit blocks 1 and 2 constitute one group, one group is constituted by the circuit blocks 3 and 4, and the scan chain is divided into two groups by the switching control signals SC1 to SC3 around the flip-flop F2.

By enabling the clock control signals SMC1 and SMC2 during the same period, the clock signals CLK1 and CLK2 are generated by one cycle, the shifting operation of the circuit blocks 1 and 2 is performed.

Thereafter, by disabling the clock control signals SMC1, SMC2, and enabling the clock control signals SMC3, SMC4, the clock signals CLK3, CLK4 are generated in one cycle, and the shifting operation of the circuit blocks 3 and 4 is performed.

Thereafter, by disabling the clock control signal SMC3, SMC4, and enabling the clock control signal SMC1, SMC2, the clock signals CLK1 and CLK2 are generated in one cycle again, and the shifting operation of the circuit blocks 1, 2 is performed. This series of operations is repeated until the shift operation is completed.

Since the capture configuration 3 is selected in the capture mode, the scan chain is divided into three groups, since one group in circuit blocks 1 and 2 and each of circuit blocks 3 and 4 constitute one group.

Thus, one scan chain, divided into two groups in the shift mode, divided into three groups in the capture mode, it is possible to perform the shift operation and capture operation by individually supplying a clock to each group.

As described above, according to the present configuration, the control parameters such as the shift configuration and the capture configuration in which a plurality of parameters are stored in the memory can be held, and the control circuit can read the data before the execution of the scan test and reflect the data to the control of the semiconductor device. Thus, a test operation can be performed by dividing one scan chain into an arbitrary number of groups in each of the shift mode and the capture mode.

Generally, there is a trade-off between test execution time and instantaneous power consumption in scan testing, and to find the optimal solution, a lot of time is spent for optimizing the design of semiconductor devices and power analysis. However, since the priority between the test execution time and the instantaneous power consumption differs depending on the needs, it is desirable to adjust both according to the priority. In contrast, according to the present configuration, the adjustment of the test execution time and the instantaneous power consumption can be performed according to the needs for the scan test.

Further, in the present configuration, the shift mode and the capture mode, it may be set different number of groups. Therefore, it becomes possible to separately satisfy the requirement of instantaneous power consumption in the shift mode and the capture mode. As a result, the time required for power analysis and design optimization can also be reduced.

In addition, the grouping of scan chains can be freely customized by changing the user's settings depending on whether the test run time or the instantaneous power consumption is prioritized.

Fourth Embodiment

The semiconductor device according to a fourth embodiment will be described. The semiconductor device 400 according to the fourth embodiment is a modification of the semiconductor device 300 according to the third embodiment, and is configured to be able to more flexibly group the scan chains.

Figure 11:
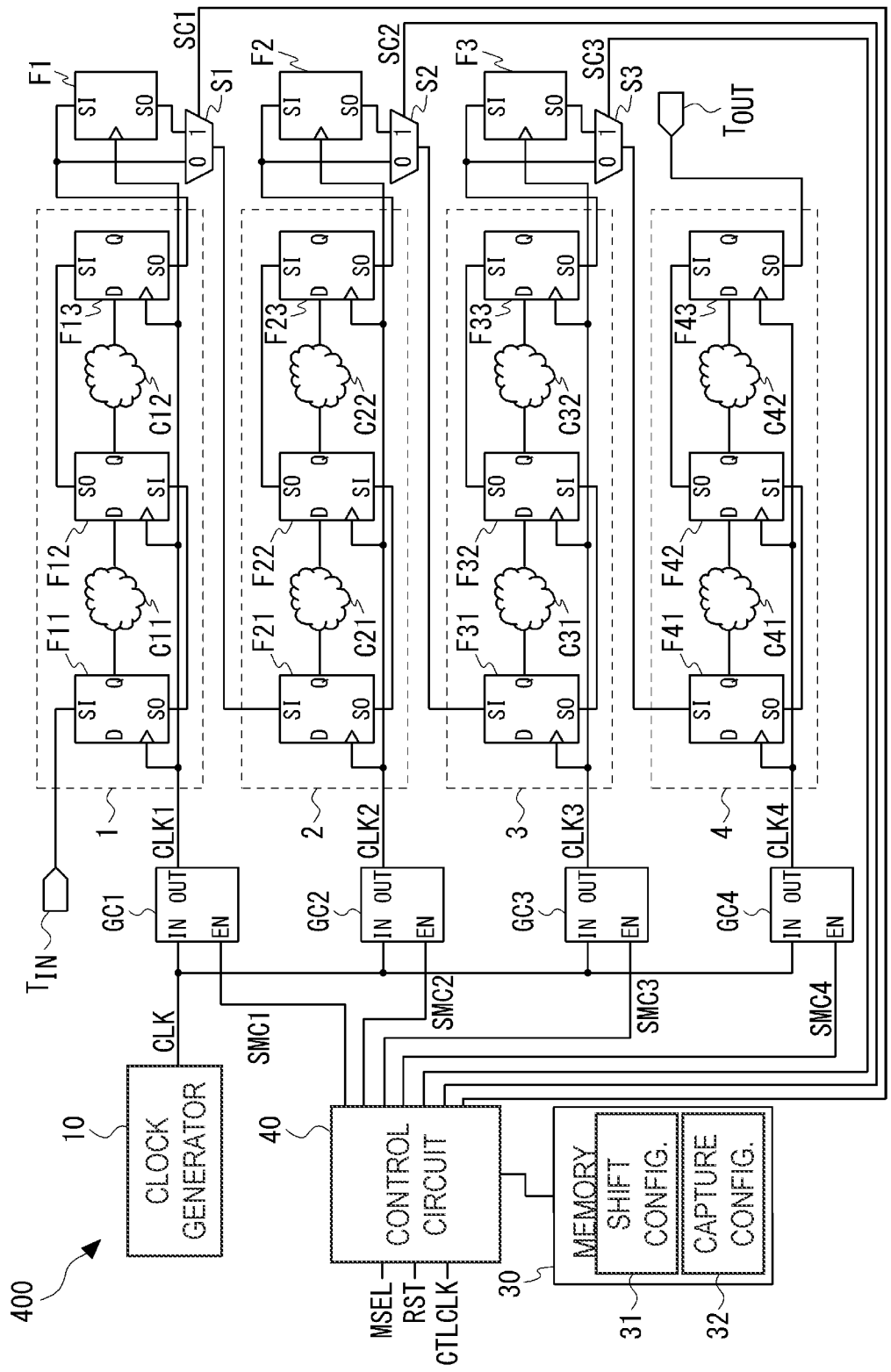
FIG. 11 is a diagram schematically showing configuration of a semiconductor device according to a fourth embodiment.

FIG. 11 schematically shows the configuration of a semiconductor device 400 according to the fourth embodiment. The semiconductor device 400 has a configuration in which the control circuit 20 of the semiconductor device 300 is replaced with a control circuit 40.

Figure 12:
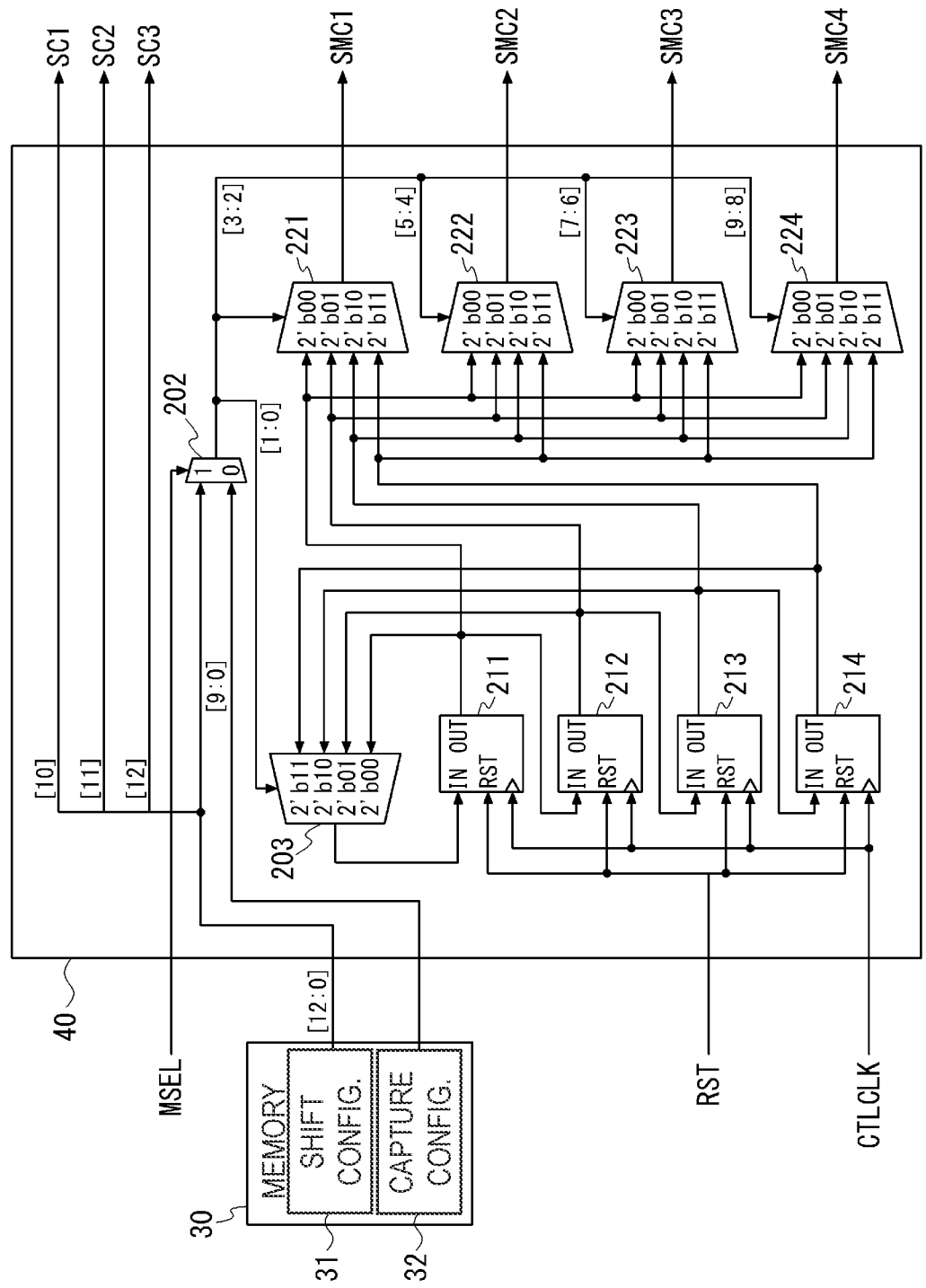
FIG. 12 is a diagram schematically showing configuration of the control circuit according to the fourth embodiment.

Hereinafter, the control circuit 40 will be explained. FIG. 12 shows the configuration of the control circuit 40 according to the fourth embodiment schematically. The control circuit 40 removes the decoder 201 of the control circuit 20 according to the third embodiment, and has a configuration in which changing the internal connection relationship.

In this configuration, the outputs of each of the flip-flops 211 to 214 are output to a select circuit 203 and select circuits 221 to 214.

The control circuit 40, from the shift configuration 31 and the capture configuration 32, as a configuration number, 13-bit value [12:0] is input. Of these, among the configuration numbers [12:0] from the shift configuration 31, the upper three bits [10], and are respectively outputted from the control circuit 40 as switching control signals SC1 to SC3.

The lower 10 bits [9:0] of the 13-bit values [12:0] are input to the selection circuit 202. The selection circuit 202 divides the lower 10 bits [9:0] into five 2-bit values and outputs them. Here, [1:0] is output to the selection circuit 203, [3:2] to the selection circuit 221, [5:4] to the selection circuit 222, [7:6] to the selection circuit 223, and [9:8] to the selection circuit 224.

Other configurations of the control circuit 40 is the same as the control circuit 20, the description thereof will be omitted.

Next, the operation of the scan test of the semiconductor device 400. FIG. 13 shows a shift configuration according to the fourth embodiment. FIG. 14 shows the capture configuration according to the fourth embodiment. For simplicity of illustration, the shift configuration is abbreviated as SCON and the capture configuration as CCON.

As shown in FIGS. 13 and 14, shift configuration 31 and capture configuration 32 controls the selection of the selection circuits S1 to S3 of the semiconductor device 400, and is set as a value for controlling the value of the clock control signals SMC1 to SMC4 outputted from the selection circuits 221 to 224. Thus, it is possible to divide the scan chain into groups of 1 to 4 and specify the circuit blocks belonging to each group.

As shown in FIG. 13, in the shift configuration 1, the circuit blocks 1 to 4 constitute a single scan chain without being divided.

In the shift configurations 2-1 to 2-3, the scan chains are divided into two. In the shift configuration 2-1, circuit blocks 1, 2 constitute one group and circuit blocks 3, 4 constitute one group. In the shift configuration 2-2, one group is formed by the circuit block 1 and one group is formed by the circuit blocks 2 to 4. In the shift configuration 2-3, one group is formed by the circuit blocks 1 to 3 and one group is formed by the circuit block 4.

In the shift configurations 3-1 to 3-3, the scan chains are divided into three. In the shift configuration 3-1, the circuit blocks 1, 2 constitute one group, the circuit block 3 constitutes one group and the circuit block 4 constitutes one group. In the shift configuration 3-2, the circuit block 1 constitutes one group, the circuit blocks 2, 3 constitute one group and the circuit block 4 constitutes one group. In the shift configuration 3-3, the circuit block 1 constitutes one group, the circuit block 2 constitutes one group and the circuit blocks 3, 4 constitute one group.

In shift configuration 4, the circuit blocks 1 to 4 are divided into four.

As for the capture configuration 1, 2-1 to 2-3, 3-1 to 3-3, and 4, the method of separating the scan chains is the same as the shift configuration 1, 2-1 to 2-3, 3-1 to 3-3, and 4, and thus description thereof will not be repeated.

Figure 15:
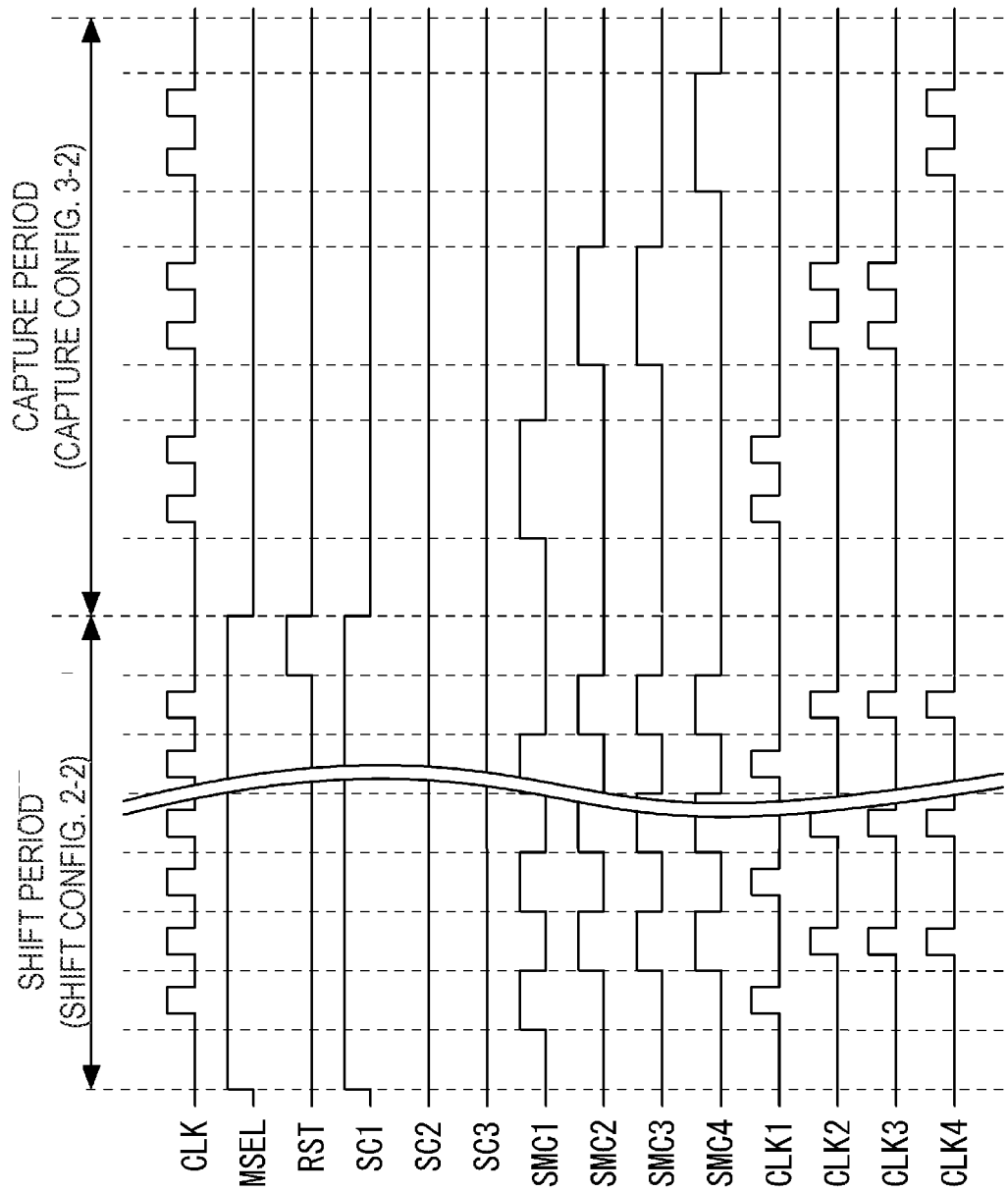
FIG. 15 is a timing chart of each signal when selecting shift configuration 2-2 in the shift mode and the shift configuration 3-2 in the capture mode according to the fourth embodiment.

Here, as an example, the shift configuration 2-2 in the shift mode, the case of selecting the shift configuration 3-2 in the capture mode will be specifically described. FIG. 15 shows the timing chart of each signal when shift configuration 2-2 is selected in shift mode and capture configuration 3-2 is selected in capture mode.

When the shift configuration 2-2 is selected in the shift mode, the switching control signal SC1 is "1'b1", the switching control signal SC2 and SC3 is "1'b0". Therefore, the selection of the selection circuit S1 becomes 1, the selection of the selection circuits S2, S3 becomes 0.

Since "2'b00" is inputted from the selection circuit 202, the selection circuit 221 outputs a signal outputted by the flip-flop 211 as a clock control signal SMC1. Since the selection circuits 222 to 224 are inputted with "2'b01" from the selection circuit 202, signals output by the flip-flop 212 are respectively output as clock control signal SMC2 to SMC4.

Thus, as described above, two groups of one group in the circuit block 1 and one group in the circuit blocks 2 to 4 are constituted.

Since "2'b00" is inputted from the selection circuit 202, the selection circuit 221 outputs a signal outputted by the flip-flop 211 as a clock control signal SMC1. Since "2'b01" is inputted from the selection circuit 202, the selection circuits 222 and 223 output a signal outputted by the flip-flop 212 as a clock-controlled signal SMC2 and a SMC3, respectively. Since "2'b10" is inputted from the selection circuit 202, the selection circuit 224 outputs a signal outputted by the flip-flop 213 as a clock control signal SMC4.

Thus, as described above, the circuit block 1 constitutes one group, the circuit blocks 2, 3 constitute one group and the circuit blocks 4 constitutes one group.

Since the operation of the shift mode and the capture mode are the same as those of the first to third embodiments, the description thereof will not be repeated.

As described above, according to the present configuration, the test operation can be performed by dividing one scan chain into an arbitrary number of groups in each of the shift mode and the capture mode. This allows the user to adjust the test run time and instantaneous power consumption by changing the settings to meet the needs of the user performing the scan test.

Further, in the semiconductor device 300 according to the third embodiment, when dividing one scan chain into two and three, there was only one division, respectively. In contrast, according to the present configuration, when one scan chain is divided into two, it can be selected from three dividing methods, and when divided into three, it can be selected from three dividing methods. Therefore, according to the present configuration, if necessary, it is possible to perform a scan test by dividing one scan chain into a plurality of groups more flexibly.

OTHER EMBODIMENTS

The present invention is not limited to the above embodiment, it is possible to change as appropriate without departing from the scope. For example, in the first embodiment, the case of dividing one scan chain into four circuit blocks has been described, but this is only an example. One scan chain may be provided with two or more arbitrary number of circuit blocks.

In first embodiment, when N is an arbitrary positive integer of 2 or more and N circuit blocks are provided in one scan chain, N−1 time storage flip-flops may be provided one by one and each between two neighboring circuit blocks.

In second embodiment to fourth embodiment, when N circuit blocks are provided in one scan chain, it is sufficient to provide N−1 selection circuits similar to the selection circuits S1 to S3 corresponding to N−1 time storage flip-flops. Even in this case, it is needless to say that the scan chain can be flexibly grouped by appropriately setting the shift configuration and the capture configuration.

In this case, in one group, of (N−1)th circuit block from the first, when only one circuit block is included, the selection circuit subsequent-stage to each circuit block, the data output from the time storage flip-flop subsequent to each circuit block, the subsequent group It will be output to.

Further, when two or more M circuit blocks contiguous to one group is included, M−1 selection circuit subsequent to M−1 circuit block from the first, the data output from the circuit block of the previous stage, the circuit block of the subsequent stage to output. Incidentally, when the M consecutive circuit blocks of (N−1)th circuit block from the first are included in one group, the selection circuit subsequent to the M-th circuit block, the time storage flip-flop subsequent to the M-th circuit block data to be output to the subsequent group.

Further, in the third and fourth embodiments, M as any integer of 2 or more, one group includes M circuit blocks, and a selection circuit subsequent-stage to each circuit block, it may include a.

The configuration of the control circuit is not limited to the configuration described above, as long as it can realize the desired control for the clock signal supplied to each circuit block may be any other configuration as appropriate.

In the embodiments described above, although each circuit block has been described as having three flip-flops and two combinational circuits, this is exemplary only. The circuit block may be configured as having any number of flip-flops and any number of combinational circuits.

Although the invention made by the present inventor has been specifically described based on the embodiment, the present invention is not limited to the embodiment described above, and it is needless to say that various modifications can be made without departing from the gist thereof.

What is claimed is:

1. A semiconductor device comprising:
    a scan chain configured between a scan input terminal and a scan output terminal and divided into a plurality of circuit blocks;
    a plurality of temporary storage flip-flops, each of the plurality of temporary storage flip-flops being connected between an output of one of two adjacent circuit blocks of the plurality of circuit blocks and an input of the other of the two adjacent circuit blocks;
    a clock signal generating unit for outputting a clock signal used for a scan test;
    a plurality of clock gating cells for receiving the clock signal output from the clock signal generating unit, and outputting corresponding clock signals to the plurality of circuit blocks and to the plurality of temporary storage flip-flops; and
    a control circuit for controlling the plurality of clock gating cells, so as to operate each of the circuit blocks at different timings one by one from a side of the scan input terminal, and simultaneously operate each circuit block and each temporary storage flip-flop connected to the output of one of the two adjacent circuit blocks,
    wherein the control circuit controls the plurality of clock gating cells so as to operate the circuit blocks sequentially one by one from the scan input terminal side at timings that differ by one cycle of the clock signal.

2. The semiconductor device according to claim 1,
    wherein N is an integer greater than or equal to 2, the number of circuit blocks provided is N and the number of the clock gating cells provided is N, the number of the temporary storage flip-flops provided is N−1, and each of the N clock gating cells supplies the clock signal to the N circuit block respectively, and
    wherein k is an integer greater than or equal to 1 and less than or equal to N−1, the k-th clock gating cell outputs the clock signal to the k-th circuit block counted from the side of the scan input terminal and the k-th of the temporary storage flip-flop connected to the output of the k-th circuit block, and the N-th clock gating cell outputs the clock signal to the N-th circuit block counted from the side of the scan input terminal.

3. The semiconductor device according to claim 2, further comprising N−1 selection circuits,
    wherein k-th selection circuit outputs either a data output from the k-th circuit block or one of a data output from the k-th time storage flip-flop to k+1-th circuit block, in response to control by the control circuit,
    wherein the control circuit switches whether to output either the data output from the circuit block of the previous stage or the data output from the temporary storage flip-flop of the previous stage, for each of N−1 selection circuits.

4. The semiconductor device according to claim 2, further comprising N−1 number of selection circuits,
    wherein the k-th selection circuit outputs either data outputted from the k-th circuit block or one of data outputted from the k-th storage flip-flop to k+1-th circuit block, in response to control by the control circuit,
    wherein the N circuit blocks include one circuit block or two or more consecutive circuit blocks, and are divided into groups of 2 or more and N or less, each including the selection circuit connected to the subsequent stage of each circuit block,
    wherein the control circuit controls, for a group including the one circuit block, when the selection circuit and the temporary storage flip-flop are connected to the subsequent stage of the one circuit block, the selection circuit is connected to the one circuit block,
    wherein the control circuit controls, for each of the group including the two or more consecutive blocks, M is an integer of 2 or more, the number of the two or more continuous circuit blocks is M, j is an integer of 1 or more M−1 or less, the j-th selection circuit so as to output the data outputted from the j-th circuit block to the j+1-th circuit block, and when the selection circuit and the temporary storage flip-flop are connected to the subsequent stage of the M-th circuit block, the M-th selection circuit so as to output data outputted from the temporary storage flip-flop connected to the subsequent stage of the M-th circuit block,
    wherein the control block controls the M clock gating cells connected to the group so that the clock signal at the same timing is supplied to the continuous M circuit blocks included in the same group.

5. The semiconductor device according to claim 4, wherein the control circuit controls the N clock gating cells, so as to operate the two or more N or less groups at different timing by one cycle of the clock signal, one by one from the side of the scan input terminal.

6. The semiconductor device according to claim 5, further comprising a memory for storing control information used by the control circuit,
    wherein the control circuit changes the configuration of the two or more N or less groups, in a shift mode and a capture mode, based on the control information.

7. A scan test method for semiconductor devices, the scan test method comprising:

a plurality of clock gating cells receives a clock signal used for a scan test, and outputs the clock signal to a plurality of circuit blocks configured between a scan input terminal and a scan output terminal, and a plurality of temporary storage flip-flops each of which is connected between an output of one of two adjacent circuit blocks of the plurality of the circuit blocks and an input of the other of the two adjacent circuit blocks; and a control circuit operates each of the circuit blocks at different timings one by one from a side of the scan input terminal, and simultaneously operates each circuit block and each temporary storage flip-flop connected to the output of one of the two adjacent circuit blocks, wherein the control circuit controls the plurality of clock gating cells so as to operate the circuit blocks sequentially one by one from the scan input terminal side at timings that differ by one cycle of the clock signal.

* * * * *